(12) United States Patent
Yagi et al.

(10) Patent No.: US 7,541,595 B2
(45) Date of Patent: Jun. 2, 2009

(54) ELECTROMAGNETIC RADIATION DETECTING APPARATUS, RADIATION DETECTING APPARATUS, RADIATION DETECTING SYSTEM AND LASER PROCESSING METHOD

(75) Inventors: Tomoyuki Yagi, Honjo (JP); Tadao Endo, Honjo (JP); Toshio Kameshima, Kumagaya (JP); Katsuro Takenaka, Katsuro-Gun (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 11/449,621

(22) Filed: Jun. 9, 2006

(65) Prior Publication Data

US 2006/0289769 A1 Dec. 28, 2006

(30) Foreign Application Priority Data

Jun. 13, 2005 (JP) ............................. 2005-172466
May 31, 2006 (JP) ............................. 2006-151865

(51) Int. Cl.
*G01T 1/20* (2006.01)
(52) U.S. Cl. .................. 250/370.11; 250/362; 356/620; 438/4; 438/132
(58) Field of Classification Search ............ 250/370.11, 250/362; 356/620; 438/4, 132
See application file for complete search history.

(56) References Cited

U.S. PATENT DOCUMENTS

| | | | | |
|---|---|---|---|---|
| 4,843,329 A * | 6/1989 | Beha et al. | ............... | 250/358.1 |
| 4,868,492 A * | 9/1989 | Beha et al. | ............... | 250/472.1 |
| 5,811,790 A | 9/1998 | Endo et al. | ............... | 250/208.1 |
| 5,965,872 A | 10/1999 | Endo et al. | ............... | 250/208.1 |
| 6,049,074 A | 4/2000 | Endo et al. | ............... | 250/208.1 |
| 6,271,880 B1 | 8/2001 | Kameshima et al. | ........ | 348/244 |
| 6,489,618 B1 * | 12/2002 | Morishita | ............. | 250/370.09 |
| 6,512,217 B1 * | 1/2003 | Kameshima | ............. | 250/208.1 |
| 6,529,618 B1 * | 3/2003 | Ohara et al. | ............. | 382/132 |
| 6,600,158 B1 * | 7/2003 | Okada et al. | ............ | 250/370.11 |
| 6,818,899 B2 | 11/2004 | Endo | ..................... | 250/370.14 |
| 6,989,540 B2 | 1/2006 | Morii et al. | ............ | 250/370.11 |
| 7,126,158 B2 | 10/2006 | Morii et al. | .................. | 257/59 |
| 2003/0042482 A1 * | 3/2003 | Jun et al. | ...................... | 257/40 |
| 2003/0168604 A1 * | 9/2003 | Nomura et al. | ........ | 250/370.11 |

FOREIGN PATENT DOCUMENTS

JP 9-288184 11/1997
JP 2004-179645 6/2004

\* cited by examiner

*Primary Examiner*—David P Porta
*Assistant Examiner*—Jessica L Eley
(74) *Attorney, Agent, or Firm*—Fitzpatrick, Cella, Harper & Scinto

(57) ABSTRACT

As to an electromagnetic radiation detecting apparatus, a radiation detecting apparatus, a radiation detecting system and a laser processing method, a TFT is disposed on an insulating substrate. A conversion element converting electromagnetic radiation into an electric signal is disposed over the TFT. A member for marking the position of the switching element is disposed on the conversion element. The position of a switching element having a defect can be located by means of the member on the conversion element. By radiating laser light to be focused on the member, it becomes possible to perform repair accurately.

18 Claims, 6 Drawing Sheets

PIXEL FRONT VIEW

PIXEL SECTIONAL VIEW

PIXEL FRONT VIEW

PIXEL SECTIONAL VIEW

ELECTROMAGNETIC RADIATION DETECTING APPARATUS, RADIATION DETECTING APPARATUS, RADIATION DETECTING SYSTEM AND LASER PROCESSING METHOD

BACKGROUND OF THE INVENTION

1. Field of the Invention

The present invention relates to an electromagnetic radiation detecting apparatus, a radiation detecting apparatus, a radiation detecting system and a laser processing method, and more particularly to an electromagnetic radiation detecting apparatus, a radiation detecting apparatus, a radiation detecting system and a laser processing method, each making it easy to repair a sensor array by removing a defect therein. In addition, in the present invention, it is supposed that light such as visible light, infrared light, ultraviolet light and the like, and radiations such as an X-ray, an α-ray, a β-ray, a γ-ray and the like are included in an electromagnetic radiation.

2. Description of Related Art

In recent years, many liquid crystal display devices and optical sensors, each including a switching element array composed of thin film transistors (TFT) using a non-single crystalline semiconductor such as hydrogenated amorphous silicon (a-Si:H) formed on a glass substrate have been produced.

A driving principle common to that of a MOS transistor formed of a single crystalline semiconductor can be applied to the TFT formed of the non-single crystalline semiconductor, and the characteristics of the TFT's formed of the non-single crystalline semiconductor are uniform even when they are formed in a large area.

Moreover, the switching element arrays using the non-single crystalline semiconductor are also applied to the optical sensors.

The hydrogenated amorphous silicon (a-Si:H), which is a kind of the non-single crystalline semiconductor, has sensitivity to visible light in a wavelength range of from about 500 nm to about 600 nm, and can generate electric charges by the photoelectric effect.

For this reason, the optical sensor such as a photodiode made of the non-single crystalline semiconductor can be produced similarly to the one made of crystalline silicon.

Furthermore, because an optical sensor manufacturing process using the non-single crystalline semiconductor is almost the same as a TFT array manufacturing process of a liquid crystal display, a two-dimensional sensor combining the TFT and the optical sensor can be easily manufactured.

Consequently, if an optical sensor array using the non-single crystalline semiconductor is used, a very large optical sensor can be produced.

If such a large area sensor is used as a sensor of a copier and a document scanner for digitizing documents on paper media, the scanning by means of a reduction optical system and a line sensor becomes unnecessary, and it is possible to shorten the time of reading a manuscript and to improve the image quality of a read image.

Furthermore, the optical sensor can be used as the optical (electromagnetic radiation) sensor for a radiation image pick-up apparatus by combining the optical sensor with a phosphor converting a radiation into visible light.

Because the non-single crystalline semiconductor such as the amorphous silicon has X-ray resistance higher than that of the crystalline semiconductor, and because the non-single crystalline semiconductor can be formed in a large area uniformly, a sensor of a size required for the radiography of a human body can be easily realized by using the non-single crystalline semiconductor.

Now, a digital X-ray image pick-up apparatus (radiation image pick-up apparatus) is put to practical use. The digital X-ray image pick-up apparatus combines a photoelectric conversion device with a wavelength converter such as a phosphor converting a radiation into visible light. The photoelectric conversion device arranges pixels in two dimensions of rows and columns. Each of the pixels combines a photoelectric conversion element formed of the non-single crystalline semiconductor such as the amorphous silicon with a switching element such as the TFT on an insulating substrate such as the glass substrate.

FIG. 4 is a circuit diagram showing the image pick-up unit in a digital X-ray image pick-up apparatus.

The image pick-up unit is composed of a photoelectric conversion element 307 arranging a plurality of pixels in two dimensions, each pixel using a TFT as the switching element and an MIS type photoelectric conversion element as the photoelectric conversion element, drive circuits 301 controlling on/off of the TFT's, signal amplifier circuits 304 building in amplifiers 305, each amplifying an electric signal output from each of the TFT's, sample hold circuits 302 holding the signals from the signal amplifier circuits 304 for a period until transferring the signals to A/D converters 306, multiplexer circuits 303 reading the electric signals held in the sample hold circuits 302 in time sequence, the A/D converters 306 converting analog signals output from the multiplexer circuits 303 into digital signals, sensor power sources 308 supplying voltages necessary for photoelectric conversion to the photoelectric conversion elements, and a power source (Vcom) 309 for turning on the TFT's, and a power source (Vss) 310 for turning off the TFT's.

Moreover, because the sensor power sources 308 supplying the voltages necessary to photoelectric conversion are equipped with a plurality of voltage sources of a voltage for refresh and a voltage for photoelectric conversion because the MIS type photoelectric conversion elements need the refresh as described in Japanese Patent Application Laid-Open No. H09-288184.

In the image pick-up unit shown in FIG. 4, a signal line is shared by a plurality of pixels in a column direction, and a gate line is shared by a plurality of pixels in a row direction. Moreover, a bias line for supplying a bias to the photoelectric conversion elements is shared by all the pixels.

Moreover, the image pick-up unit takes a form in which two image pick-up units are substantially provided, and each of the two image pick-up units can be independently driven.

Moreover, the drive circuits 301 are not necessary on both the sides of the gate lines, and the drive circuits 301 may be provided only on one side of the gate lines when the wiring resistance of the gate lines is sufficiently small.

FIG. 5 is a sectional view showing the cross-sectional structure of a pixel in the photoelectric conversion device 307.

The pixel uses a TFT 416 as a switching element and an MIS type photoelectric conversion element 417 as the photoelectric conversion element. The TFT 416 is composed of at least a gate electrode 315 formed of aluminum or an aluminum alloy on an insulative substrate 401 such as glass, an insulating layer 402 formed of an amorphous silicon nitride film, which is an insulative non-single crystalline semiconductor thin film, on the gate electrode 315, a semiconductor layer 403 formed of hydrogenated amorphous silicon (a-Si: H), which is a non-single crystalline semiconductor, impurity semiconductor layers 404 formed of N⁺ type amorphous silicon having negative conductivity formed with an object of realizing ohmic contact between the semiconductor layer 403 and a drain electrode 406 and between the semiconductor layer 403 and a source electrode 405, the source electrode 405 formed of aluminum or an aluminum alloy, and the drain electrode 406.

The MIS type photoelectric conversion element 417 is formed on the insulative substrate 401 such as the glass substrate, on which the TFT 416 is formed. The MIS type photoelectric conversion element is composed of a lower electrode layer 407 formed of aluminum or an aluminum alloy, an insulating layer 408 formed of an amorphous silicon nitride film, which is a non-single crystalline semiconductor thin film, on the sensor lower electrode layer 407, a photoelectric conversion layer 409 formed of a-Si:H, which is a non-single crystalline semiconductor and absorbs visible light to generate electric charges, an impurity semiconductor layer 410, which is formed of $N^+$ type amorphous silicon having negative conductivity with an object of preventing the injection of holes from a bias line 313 into the photoelectric conversion layer 409, an upper electrode layer 411, which is formed of a transparent electrode such as ITO and functions as an electrode for applying a voltage necessary for the photoelectric conversion element 417, and the bias line 313, which is made of aluminum or an aluminum alloy with an object of supplying a voltage to the photoelectric conversion element 417 to give a bias.

Here, because the layer configurations of the TFT 416 and the MIS type photoelectric conversion element 417 are almost the same as each other, the formation of the TFT 416 and the MIS type photoelectric conversion element 417 at the same time simplifies the process of manufacturing them and makes it possible to improve the yield of the manufacturing and to reduce the cost of manufacturing the sensor.

Moreover, the TFT 416 and the sensor may be formed independently.

In this case, because the film thickness of each layer can be optimized in order to be suitable for each object although the manufacturing process becomes complicated in comparison with that of the formation at the same time, the performance of the sensor is improved in comparison with the case of the formation at the same time.

In recent years, in a digital X-ray image pick-up apparatus, the sensitivity of the digital X-ray image pick-up apparatus has been regarded as important from a viewpoint of image quality and the decrease of the exposure dose of a patient. Moreover, in order to apply the digital X-ray image pick-up apparatus to the application in which X-rays are radiated to a patient for a long time such as fluoroscopy or CT, it becomes necessary to enlarge the area of the optical sensor occupying a pixel, i.e. an aperture ratio, as much as possible to improve the sensitivity of the sensor.

Although devices of reducing the size of the switching element, narrowing spaces between the photoelectric conversion element, the switching element and each wiring, and the like are made in order to enlarge the aperture ratio, there is also a limit in this method.

The most effective method is a method of forming the photoelectric conversion element so that it may overlap with the switching element with an interlayer insulation layer put between them.

By this method, the aperture ratio can be enlarged by leaps and bounds.

However, there is a problem in which, when the interlayer insulation layer, the photoelectric conversion element and the like are formed over the switching element, it becomes impossible to repair the switching element when a defect of the switching element is found after its formation.

Here, to repair is to perform the processing of burning off a part or the whole of the switching element having the defect with a laser, or the like and to change the switching element into a harmless state.

For example, when a short circuit occurs between the source electrode and the drain electrode of a TFT, which is a switching element, to repair the TFT is to perform the processing of cutting both the source electrode and the drain electrode of the TFT with laser light to stop the function of the TFT itself, and the like.

By performing the repairing of the defect in a digital X-ray image pick-up apparatus, the influence of the defect of the TFT to the normal pixels around the pixel of the TFT can be suppressed, and the stabilization of image quality can be attained. It is actually physically difficult to make the defects of the TFT's zero, and the fact is that the repairing of the number of the TFT's which causes no problems in quality is performed. Consequently, if no repairing of the switching elements having defects is performed, the yield of products lowers to influence the cost to a major degree.

However, in the state in which the interlayer insulation layer, the photoelectric conversion element and the like are formed over the switching element such as the TFT, an upper electrode made of a metal material also exists in addition to the fact that the thickness of the photoelectric conversion layer of the photoelectric conversion element is large in the photoelectric conversion device of the digital X-ray image pick-up apparatus. Consequently, it becomes difficult to ascertain the accurate position of the switching element from the top face of the photoelectric conversion device.

For this reason, in case of repairing a switching element having a defect, there can be thought of a method of removing the constituent elements such as the photoelectric conversion element, the interlayer insulation layer and the like disposed over the switching element by the radiation of a comparatively weak laser beam in advance to make the photoelectric conversion device in a state capable of being ascertained, and of burning off a TFT with a laser.

Because this method performs a laser radiation to the upper constituent elements in the state in which the accurate position of the switching element is unknown, it is not always said that the tact and the yield in a manufacturing process are good owing to the damages of peripheral pixels, the complication of a processing process, and the like.

Thus, the commercial viability of the photoelectric conversion device including a photoelectric conversion element over a switching element, and the radiation image pick-up apparatus using the photoelectric conversion device is difficult without settling the problem in respect of manufacture.

The laser repair apparatus used now condenses the laser light having a wavelength in the range of from about 1000 nm to about 200 nm with a special microscope to vaporize or sublimate a material placed on the condensing surface of the laser, as shown in FIG. 6.

In FIG. 6, the laser repair apparatus is equipped with a laser light source 501, a reflecting optical system 502, a reduction optical system/microscope 503, a slit 504, a CCD camera 505, a sample 506, laser light 507 and an image 508.

In a processing operation, the image of a sample to which laser light is radiated is observed with the microscope while the focus of the microscope is adjusted to the processing surface of the sample to radiate the laser light. In the case where the switching element, which is the processing object, is located below the photoelectric conversion element or the interlayer insulation layer, as described above, it is impossible to focus the laser light at a suitable position.

Moreover, Japanese Patent Application Laid-Open No. 2004-179645 discloses a technique of forming an opening in the region corresponding to a switching element as a position detecting member for repairing the switching element.

However, there is a problem in which the aperture ratio of a pixel is lowered and the sensitivity of a photoelectric conversion device is lowered when openings are formed in photoelectric conversion elements.

SUMMARY OF THE INVENTION

Accordingly, it is an object of the present invention to provide a technique of not lowering the sensitivity of photoelectric conversion devices without forming openings at the time of repairing switching elements such as TFT's.

The present invention is an electromagnetic radiation detecting apparatus including an insulating substrate, a switching element disposed over the insulating substrate, a photoelectric conversion element disposed over the switching element, and a member for marking a position of the switching element, the member disposed over the photoelectric conversion element, as means for settling the problem.

Moreover, the present invention is a radiation detecting apparatus including an insulating substrate, a switching element disposed over the insulating substrate, a photoelectric conversion element disposed over the switching element, a wavelength converter disposed over the photoelectric conversion element, the wavelength converter converting a radiation into light, and a member for marking a position of the switching element, the member disposed between the photoelectric conversion element and the wavelength converter.

Moreover, the present invention is a laser processing method of an electromagnetic radiation detecting apparatus including an insulating substrate, a TFT disposed over the insulating substrate, and a conversion element for converting an electromagnetic radiation disposed over the TFT into an electric signal, the method including a first step of forming a member for marking a position of the switching element over the conversion element; a second step of locating the member for marking the position of the switching element having a defect, and a third step of irradiating the member with radiating laser light.

According to the present invention, in a two-dimensional sensor in a photoelectric electromagnetic radiation detecting apparatus and a radiation detecting apparatus such as an X-ray image pick-up apparatus, it is possible to repair a TFT without lowering the sensitivity of a sensor even when a photoelectric conversion element is disposed over the TFT for sensitization.

DESCRIPTION OF THE PREFERRED EMBODIMENTS

In the following, the best embodiments for implementing the present invention are described with reference to the attached drawings. In addition, in the present specification, a photoelectric conversion element is not limited only to an element converting light such as visible light, infrared light, ultraviolet light and the like into electric charges, but also includes an element converting an externally arriving electromagnetic radiation into electric charges. That is, the thing entering the element is not limited only to the light, but may be an electromagnetic radiation including an X-ray, an α-ray, a β-ray, a γ-ray and the like. Moreover, a photoelectric conversion is supposed to be a phenomenon which is not limited only to that of converting light such as visible light, infrared light, ultraviolet light and the like into electric charges, but also that of converting an electromagnetic radiation including the radiations such as an externally arriving X-ray, an α-ray, a β-ray, a γ-ray and the like.

First Embodiment

Figure 1A:
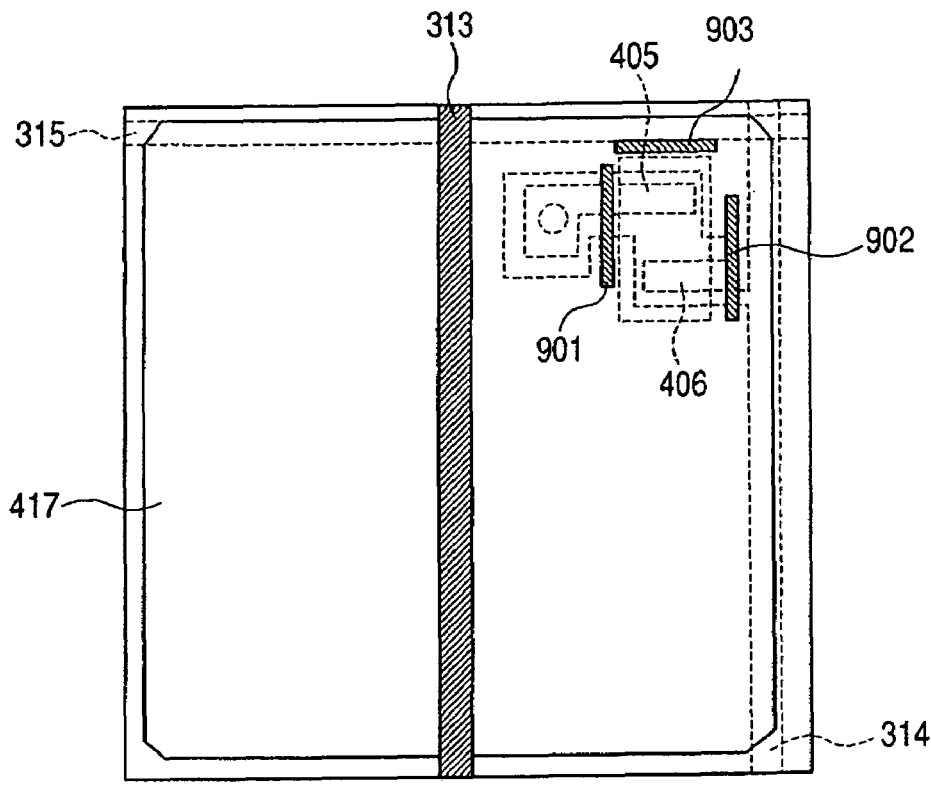
FIGS. 1A and 1B are views showing a first embodiment of the present invention.
Figure 1B:
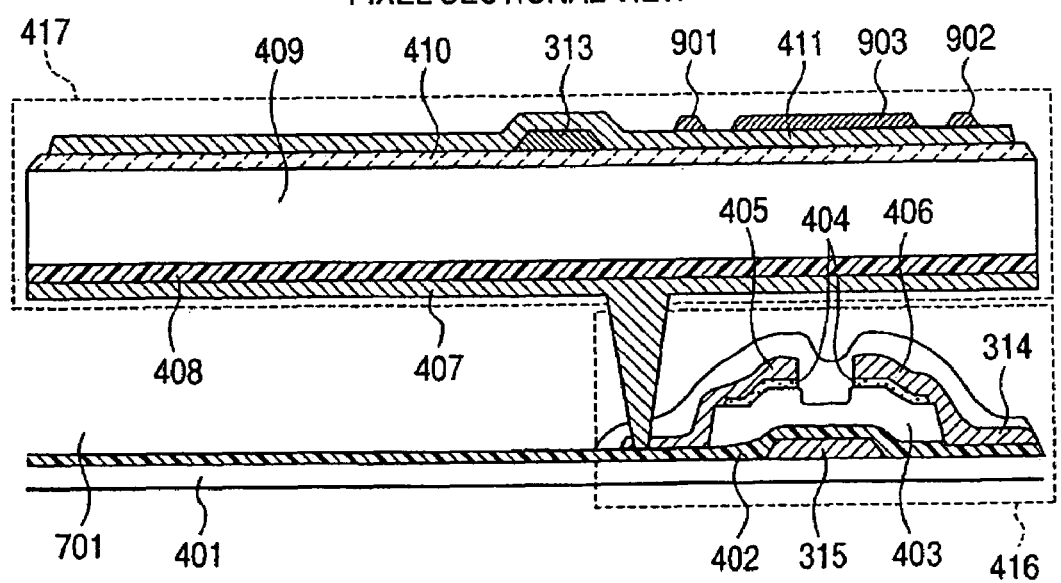

FIGS. 1A and 1B are views showing a first embodiment of the present invention.

FIGS. 1A and 1B show a front view (FIG. 1A) and a sectional view (FIG. 1B) of a pixel in an X-ray image pick-up apparatus of the first embodiment of the present invention. In FIGS. 1A and 1B, a fluorescent subject as a wavelength converter converting an X-ray into light such as visible light or the like, a protection layer and a bonding layer on a photoelectric conversion element are omitted for convenience' sake of describing the invention. Moreover, the constituent elements similar to those of the related art are denoted by the same reference numerals as those of the related art, and their detailed description is omitted.

As shown in FIGS. 1A and 1B, the present embodiment is provided with a TFT 416 as a switching element on a glass substrate 401 as an insulating substrate and a photoelectric conversion element 417 disposed over the TFT 416.

The TFT 416 is formed of a gate electrode 315, a gate insulating layer 402, a channel layer 403, $N^+$ type amorphous silicon layers 404, a first main electrode (source electrode) 405 and a second main electrode (drain electrode) 406, each constituting a source electrode or a drain electrode, and the like.

Moreover, the photoelectric conversion element 417 is formed of a sensor lower electrode layer 407, an insulating layer 408, a photoelectric conversion layer 409, an $N^+$ type amorphous silicon layer 410, a transparent electrode 411 and the like.

In the present embodiment, as shown in the sectional view of FIG. 1B, an interlayer insulation layer 701 made of an organic material is used for the securement of an insulation property between the TFT 416 and the photoelectric conversion element 417 and for surface flattening at the time of forming the photoelectric conversion element 417 over the TFT 416 for the purpose of improving the aperture ratio of the pixel.

The use of the interlayer insulation layer 701 is for avoiding a malfunction of the TFT 416 owing to a voltage applied to the photoelectric conversion element 417 when the photoelectric conversion element 417 is formed over the TFT 416 with an inorganic thin insulating layer such as a silicon nitride film. Moreover, the use of the interlayer insulation layer 701 is also for avoiding the increase of the capacity between the photoelectric conversion element 417 and a signal line 314 to increase noises.

The thickness of the organic insulation film is necessary to be about several μm for securing a sufficient insulation property, although the thickness depends on a dielectric constant. Consequently, in case of using an insulating material having a very low dielectric constant, if it exists, the thickness may be 1 μm or less.

The photoelectric conversion element 417 in the present embodiment is an MIS type photoelectric conversion element.

The MIS type photoelectric conversion element is one receiving visible light radiated from the phosphor with the photoelectric conversion layer 409 to convert the received light into electric charges.

In the MIS type photoelectric conversion element, the generated charges are stored between the photoelectric conversion layer 409 and the insulating layer 408.

The reading of the stored electric charges is performed by the flowing-in of electric charges of the same quantity as that of the electric charges stored between the photoelectric conversion layer 409 and the insulating layer 408 from the signal line 314 at the time of the turning-on of the TFT 416.

In the present embodiment, markers 901, 902 and 903 for detecting a repairing position used as guiding members at the time of performing laser repair are formed at the uppermost part of the photoelectric conversion element 417.

The markers 901, 902 and 903 are formed over the first main electrode (source electrode) 405, the second main electrode (drain electrode) 406 and the gate electrode 315 of the TFT 416, respectively, each becoming parts processed at the time of the repair, as shown in FIG. 1A.

By a process (e.g. a laser trimming) of disconnecting these three electrodes 405, 406 and 315 under a guide of the markers 901, 902 and 903, the TFT 416 can be electrically cut off from the other wiring, thereby the problem raised by the defect of the TFT 416 can be solved.

It is possible to process each electrode of the TFT 416 accurately by radiating laser light with the focus adjusting on the markers 901, 902 and 903.

The patterns of the markers may be not only lines such as the markers 901, 902 and 903 as shown in FIG. 1A, but also a dot, a dotted line, or another variation of shape. Moreover, a pattern combining two or more of the markers 901, 902 and 903 based on the lengths, the widths and the directions of the markers 901, 902 and 903 may be adoptable.

Moreover, a shape of U-letter formed by connecting together the markers 901, 902 and 903, and an O-letter shape formed by connecting together the markers 901, 902 and 903 for enclosing the portion of the TFT 416 may be adopted.

In this case, when the markers 901, 902 and 903 are detected from a position above the photoelectric conversion element 417, the markers 901, 902 and 903 can be detected as long as the patterns of the markers 901, 902 and 903 are different from the patterns of at least the portions in which the markers 901, 902 and 903 are not formed on the photoelectric conversion element 417.

Moreover, the colors of the markers 901, 902 and 903 may be detected. In this case, it is possible to detect the markers 901, 902 and 903 from above the photoelectric conversion element 417 within a detectable range as long as at least one or more of the hue, the saturation and the brightness of the colors of the markers 901, 902 and 903 are different in the characteristic from those of the portions of the photoelectric conversion element 417 where the markers 901, 902 and 903 are not formed.

And, as shown in FIG. 1B, the position of the markers 901, 902 and 903 may be detected based on a vertical level difference between tops of the markers 901, 902 and 903 and a top of the photoelectric conversion element 417.

Then, it is more preferable to detect the markers 901, 902 and 903 based on combination of two or more of the patterns, the hue, the saturation and the brightness of the colors of the markers 901, 902 and 903 for the more accurate detection of the markers 901, 902 and 903.

Moreover, as long as a laser repair apparatus is the one which includes a camera and means for performing image processing such as a circuit or software and automatically recognizes the shape of a pattern (i.e., a portion of which the hue, the saturation and the brightness of the colors or top height level is different from that of a periphery thereof) to perform location, the automatization of the location can be attained by making the laser repair apparatus recognize the markers 901, 902 and 903.

The materials suitable for forming the markers 901, 902 and 903 in the present embodiment may be opaque or semitransparent materials shaped in an electrically-conductive thin film or an insulative thin film such as a thin film made of photoresist or amorphous silicon besides a metal such as aluminum.

Moreover, it is preferable to form the markers 901, 902 and 903 to be fine and thin as much as possible within a detectable range in order not to intercept the light reaching the photoelectric conversion element 417 as much as possible. Moreover, it is preferable to be a semitransparent material.

Moreover, it is preferable that the material of the phosphor as the wavelength converter is a material including one of $Gd_2O_2S$, $Gd_2O_3$ and $CsI$ as the principal component.

In addition, although the markers are formed at three positions corresponding to each electrode of a TFT in all in the present embodiment, the number of the markers of the present invention is not limited to the number. It is acceptable that at least one marker corresponding to an electrode is formed. It is especially desired to provide a marker corresponding to the second main electrode (drain electrode) 406 connected to the signal line 314.

Second Embodiment

Figure 2A:
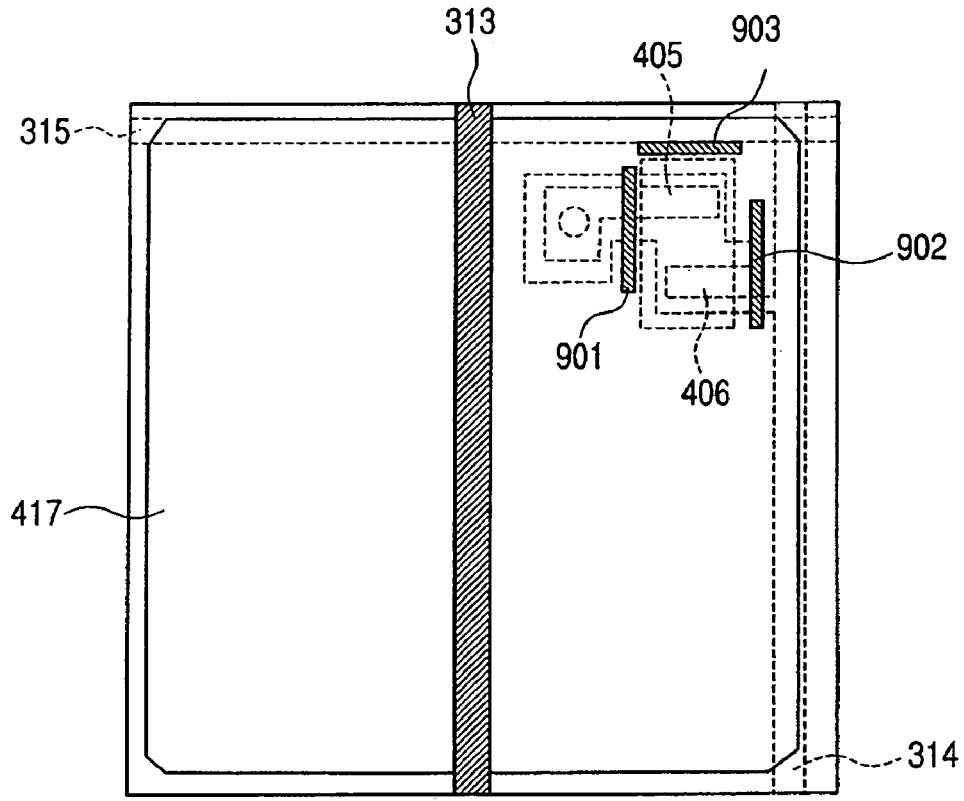
FIGS. 2A and 2B are views showing a second embodiment of the present invention.
Figure 2B:
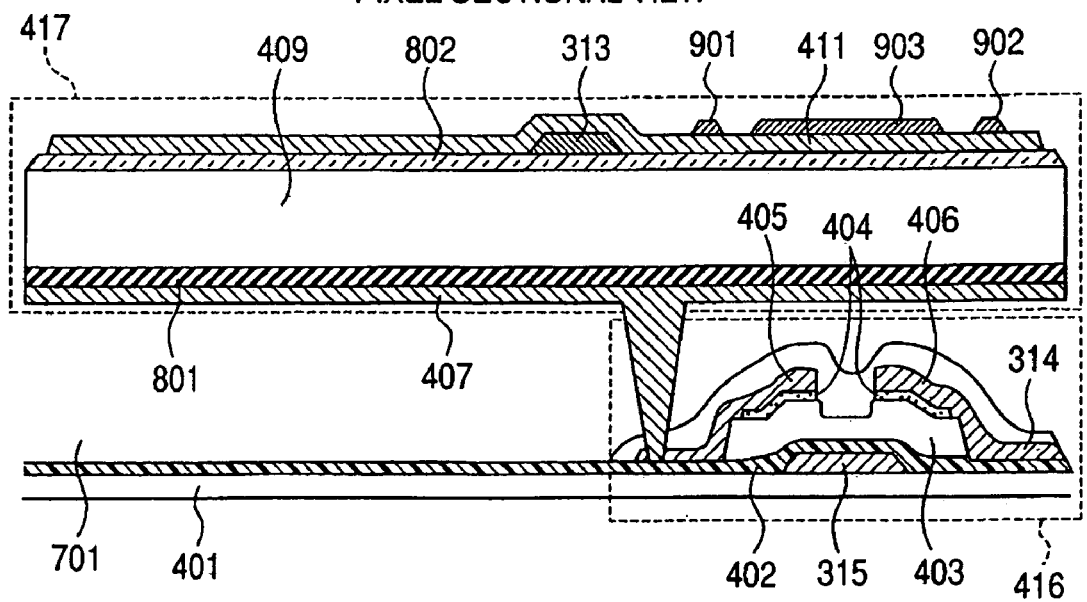

FIGS. 2A and 2B are views showing a second embodiment of the present invention.

FIGS. 2A and 2B show a front view (FIG. 2A) and a sectional view (FIG. 2B) of a pixel in an X-ray image pick-up apparatus of the second embodiment of the present invention. In FIGS. 2A and 2B, a fluorescent subject converting an X-ray into visible light, a protection layer and a bonding layer on a photoelectric conversion element are omitted for convenience' sake of describing the invention.

In the present embodiment, the constituent elements performing the same functions as those of the first embodiment are denoted by the same reference numerals as those of the first embodiment.

The embodiment attains the improvement of an aperture ratio by the similar configuration.

The photoelectric conversion element in the present embodiment is a PIN type photoelectric conversion element.

In the PIN type photoelectric conversion element, the visible light radiated from the phosphor is received by the photoelectric conversion layer and converted into electric charges. Then, the generated electric charges pass through an $N^+$ type amorphous silicon layer capable of conducting only negative carriers to be stored in the parasitic capacitance formed on the source electrode of a TFT. In FIG. 2B, 801 denotes an N+ type amorphous silicon layer, and 802 denotes a P+ type amorphous silicon layer.

The reading of the electric charges is performed by the flowing-in of the electric charges stored in the source electrode at the time of the turning-on of the TFT.

The markers 901, 902 and 903, which are used as guides at the time of performing laser repair, are formed at the uppermost part of a photoelectric conversion element also in the present embodiment like in the first embodiment.

The markers 901, 902 and 903 are formed at positions corresponding to those over the first main electrode, the second main electrode and the gate electrode, respectively, where the processing is performed at repair, as shown in FIG. 2A.

By the repair of these three electrodes, the TFT can be electrically cut off from the other wiring, and a defect caused by the badness of the TFT can be rectified.

It is possible to process each electrode of the TFT accurately by performing laser radiation with the laser light focused on the markers 901, 902 and 903.

Moreover, as long as a laser repair apparatus is the one which automatically recognizes a pattern to perform location, the automatization of the location can be attained by making the laser repair apparatus recognize the markers 901, 902 and 903.

The materials suitable for forming the markers 901, 902 and 903 in the present embodiment may be opaque or semi-transparent materials shaped in an electrically-conductive thin film or an insulative thin film such as a thin film made of photoresist or amorphous silicon besides a metal such as aluminum.

Moreover, it is preferable to form the markers 901, 902 and 903 to be fine and thin in order not to intercept the light reaching the photoelectric conversion element 417 as much as possible. Moreover, it is preferable to be a semitransparent material.

Thus, the present invention can be applied independent of the form of a photoelectric conversion element.

Third Embodiment

Figure 3:
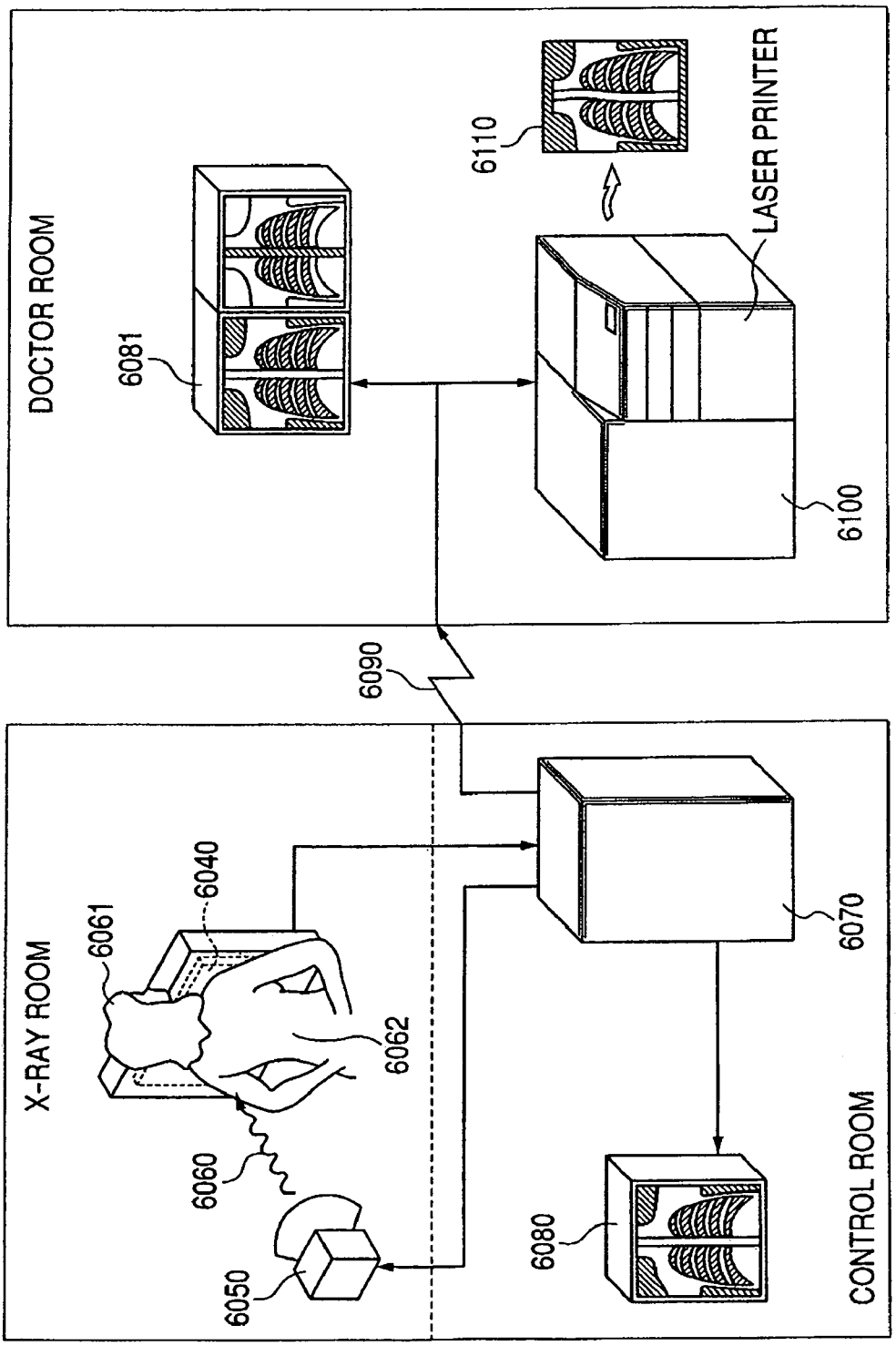
FIG. 3 is a view showing an application example of an X-ray detecting apparatus as an example of a radiation detecting apparatus according to the present invention to an X-ray diagnosis system.
Figure 4:
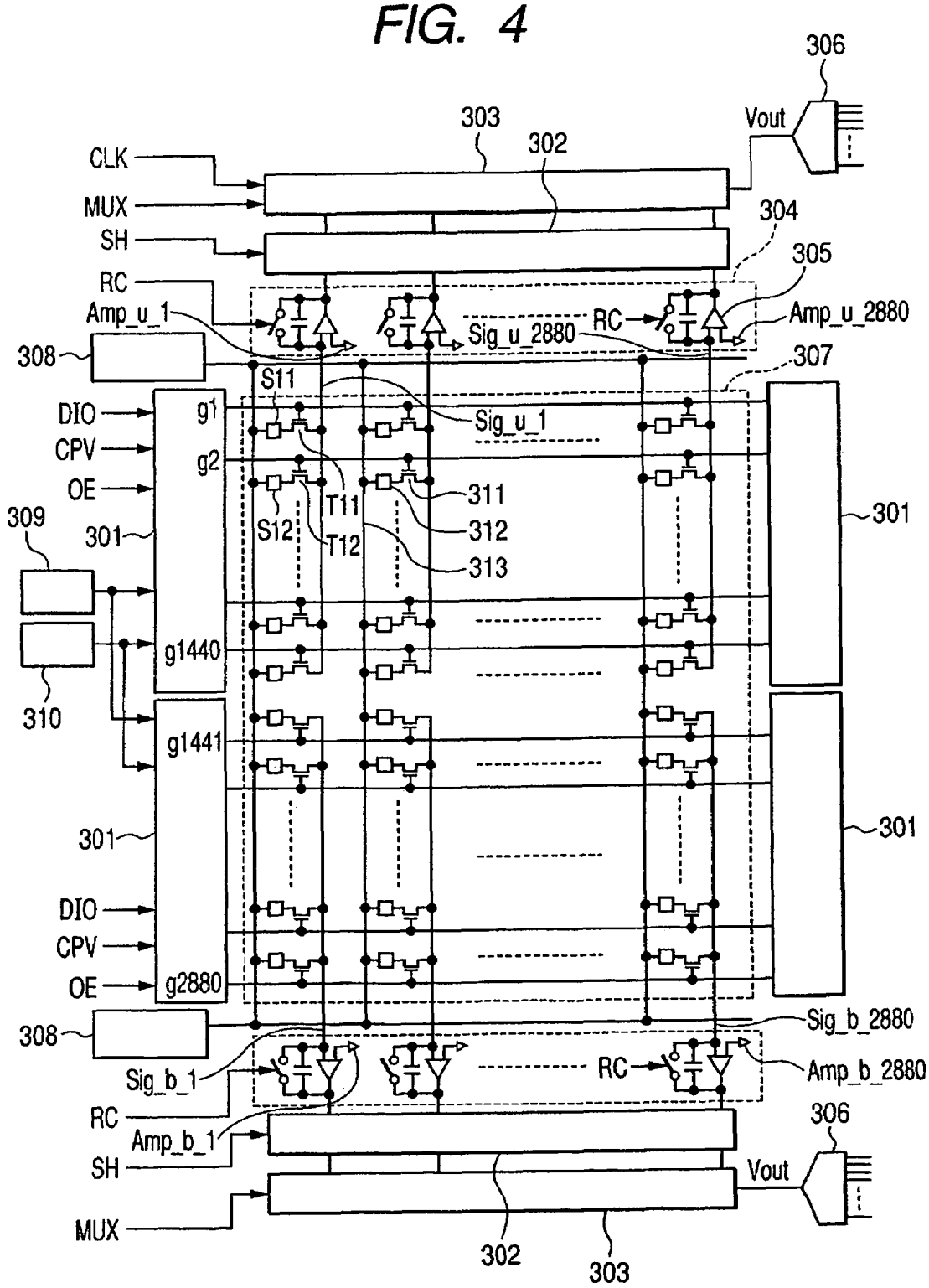
FIG. 4 is a circuit diagram showing an image pick-up unit in a digital X-ray image pick-up apparatus.
Figure 5:
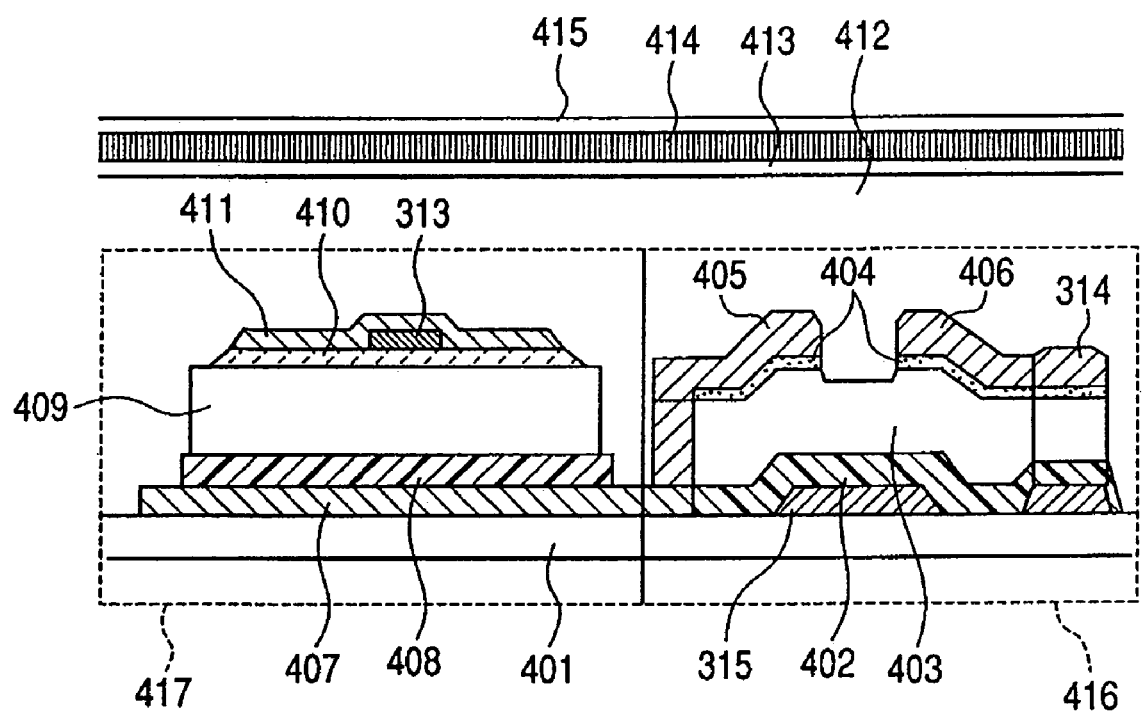
FIG. 5 is a sectional view showing the cross-sectional structure of a pixel in a two-dimensional sensor.
Figure 6:
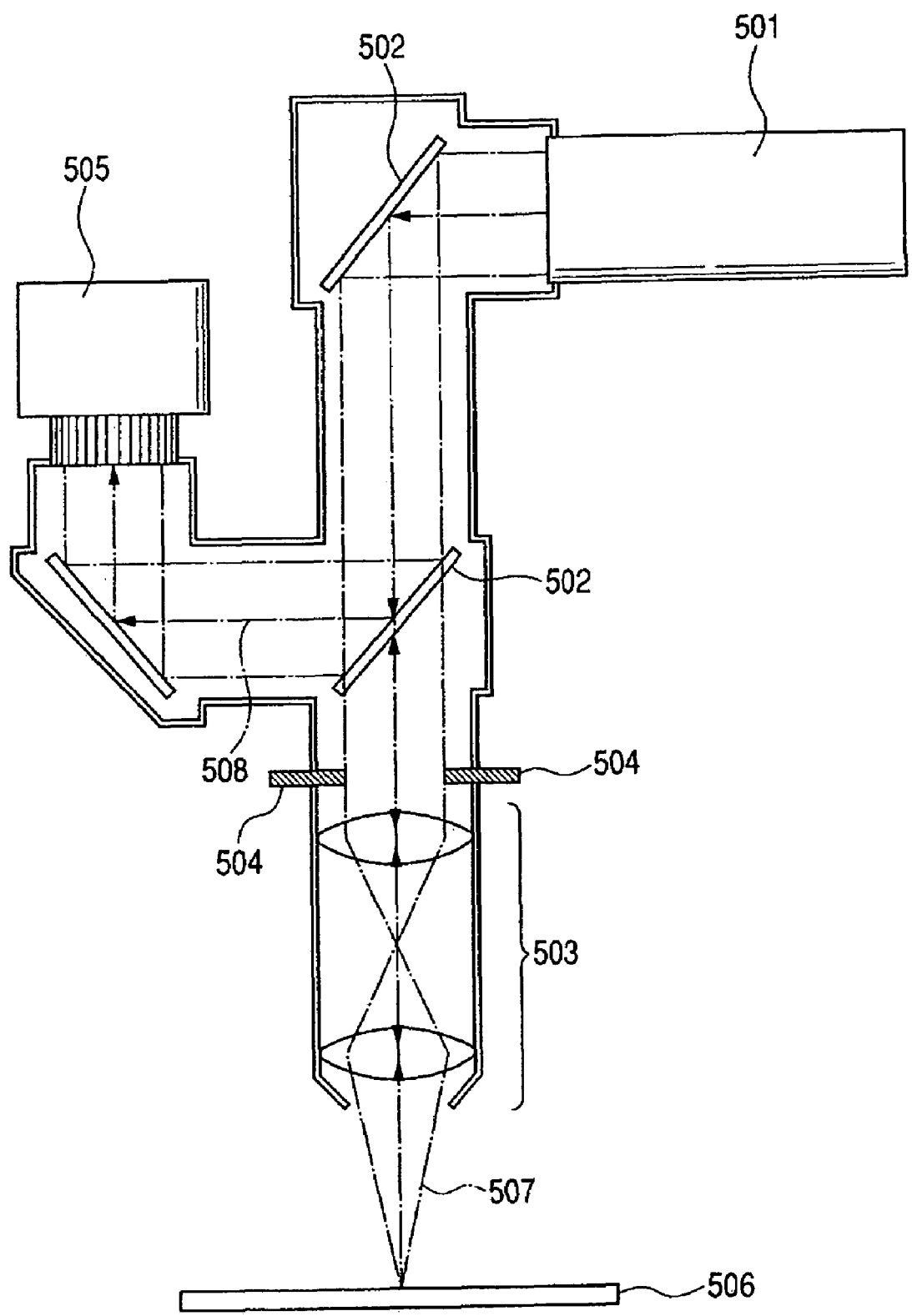
FIG. 6 is a block diagram showing a laser repair apparatus.

FIG. 3 shows an application example of an X-ray detecting apparatus as an example of a radiation detecting apparatus according to the present invention to an X-ray diagnosis system.

An X-ray 6060 generated by an X-ray tube 6050 is transmitted though the chest 6062 of a patient or a subject 6061, and enters an X-ray detecting apparatus 6040 mounted with a scintillator at the upper part thereof.

The information of the internal portion of the patient 6061 is included in the entered X-ray.

The scintillator emits light in response to the incidence of the X-ray, and the emitted light is photoelectrically converted. Then, electric information can be obtained.

The information is converted into a digital signal, and is subjected to the image processing by an image processor 6070, which is used as signal processing means. Thus, the image can be observed with a display 6080 used as display means in a control room.

Moreover, the information can be transferred to a remote place by transmission processing means such as a telephone line 6090 or the like, and can be displayed on a display 6081 used as display means in a doctor room at another place or stored in recording means such as an optical disk or the like. Thus, it also becomes possible for a doctor at a remote place to diagnose the patient 6061.

Moreover, the image can be recorded on a film 6110 used as a recording medium with a film processor 6100 used as recording means.

In addition, although the detection object of the radiation detecting apparatus is limited to the X-rays in the present embodiment, the detection object is not limited to the X-rays. Also, α-rays, β-rays and γ-rays may be used as the detection object.

In addition, the present invention can be also applied to a direct conversion type radiation detecting apparatus converting a radiation into an electric signal directly. In this case, amorphous selenium (a-Se), $PbI_2$, $HgI_2$ and CdTe can be used as the semiconductor materials performing the conversion.

This application claims priority from Japanese Patent. Applications No. 2005-172466 filed on Jun. 13, 2005 and No. 2006-151865 filed on May 31, 2006, which are hereby incorporated by reference herein.

What is claimed is:

1. An electromagnetic radiation detecting apparatus comprising:
    an insulating substrate;
    a switching element disposed over said insulating substrate;
    a photoelectric conversion element disposed over said switching element;
    an insulating layer disposed between said switching element and said photoelectric conversion element; and
    a shaped member aligned with respect to said switching element to mark a position of a portion of said switching element,
    wherein said shaped member is disposed over a part of said photoelectric conversion element, and said part includes an area aligned with said switching element.

2. An electromagnetic radiation detecting apparatus according to claim 1, wherein
    said switching element has a source electrode, a drain electrode and a gate electrode, and
    said shaped member is aligned with respect to said switching element such that said portion marked by said shaped member corresponds to an electrode of said switching element.

3. An electromagnetic radiation detecting apparatus according to claim 2, wherein said shaped member is aligned along a direction perpendicular to a direction along which any one of said source electrode, said drain electrode and said gate electrode is elongated.

4. An electromagnetic radiation detecting apparatus according to claim 1, wherein said shaped member is an insulating member.

5. An electromagnetic radiation detecting apparatus according to claim 1, wherein said shaped member is a light transmitting member.

6. An electromagnetic radiation detecting apparatus according to claim 5, wherein the light transmitting member is an electroconductive member.

7. An electromagnetic radiation detecting apparatus according to claim 1, wherein said shaped member includes a metal material.

8. An electromagnetic radiation detecting apparatus according to claim 1, wherein said shaped member includes an insulating organic film.

9. An electromagnetic radiation detecting apparatus according to claim 1, wherein said switching element is a TFT.

10. An electromagnetic radiation detecting apparatus according to claim 1, wherein said shaped member is used to discontinue an electrical connection between said switching element and a wiring connected to said switching element.

11. A radiation detecting apparatus comprising:
   an insulating substrate;
   a switching element formed over said insulating substrate;
   a photoelectric conversion element disposed over said switching element;
   an insulating layer disposed between said switching element and said photoelectric conversion element;
   a wavelength converter disposed over said photoelectric conversion element, said wavelength converter configured to convert a radiation into light; and
   a shaped member disposed between said photoelectric conversion element and said wavelength converter, said shaped member aligned with respect to said switching element to mark a position of a portion corresponding to an electrode of said switching element,
   wherein said shaped member is disposed over a part of said photoelectric conversion element, and said part includes an area aligned with said switching element.

12. A radiation detecting apparatus according to claim 11, wherein said photoelectric conversion element is an MIS type photoelectric conversion element.

13. A radiation detecting apparatus according to claim 11, wherein said photoelectric conversion element is a PIN type photoelectric conversion element.

14. A radiation detecting apparatus according to claim 11, wherein said wavelength converter is made of a material including one of $Gd_2O_2S$, $Gd_2O_3$ and CsI as a principal component.

15. A radiation detecting apparatus according to claim 11, wherein said radiation detecting apparatus is incorporated in a radiation image pick-up system that includes:
   signal processing means for processing a signal from said radiation detecting apparatus;
   recording means for recording a signal from said signal processing means;
   display means for displaying said signal from said signal processing means;
   transmitting processing means for transmitting a signal from said signal processing means; and
   a radiation source for generating said radiation.

16. A radiation detecting apparatus according to claim 11, wherein said shaped member is used to discontinue an electrical connection between said switching element and a wiring connected to said switching element.

17. A laser processing method of an electromagnetic radiation detecting apparatus that includes an insulating substrate, a TFT disposed over said insulating substrate, and a conversion element for converting an electromagnetic radiation into an electric signal, wherein said conversion element is disposed over said TFT, and wherein an insulating layer is disposed between said switching element and said conversion element, said method comprising steps of:
   aligning a shaped member with respect to a TFT to mark a position of a portion corresponding to an electrode of the TFT, said shaped member being disposed over a part of said conversion element, said part including an area aligned with said TFT;
   locating said shaped member in order to mark a position of a defect of said TFT; and
   irradiating said shaped member with laser light to discontinue an electrical connection between said TFT and a wiring connected to said TFT.

18. An electromagnetic radiation detecting apparatus comprising:
   an insulating substrate; and
   a pixel that includes:
      a switching element disposed over said insulating substrate,
      a photoelectric conversion element disposed over said switching element, wherein said photoelectric conversion element includes a lower electrode electrically connected to said switching element, a semiconductor layer, and an upper electrode,
      an insulating layer disposed between said switching element and said photoelectric conversion element, and
      a shaped member aligned with respect to said switching element to mark a position of a portion corresponding to an electrode of said switching element, said shaped member being disposed in an area that includes a part of an area on said upper electrode of said photoelectric conversion element, and that includes at least a part of an area aligned with said switching element.

* * * * *